United States Patent
Kreiner et al.

(10) Patent No.: US 7,934,649 B2
(45) Date of Patent: May 3, 2011

(54) METHODS FOR UTILIZING RF TAGS TO COLLECT DATA CONCERNING POST-CONSUMER RESOURCES

(75) Inventors: Barrett M. Kreiner, Norcross, GA (US); Donna K. Hodges, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

(21) Appl. No.: 11/943,373

(22) Filed: Nov. 20, 2007

(65) Prior Publication Data

US 2008/0069641 A1 Mar. 20, 2008

Related U.S. Application Data

(63) Continuation of application No. 11/409,829, filed on Apr. 24, 2006, now Pat. No. 7,299,982, which is a continuation of application No. 10/338,422, filed on Jan. 8, 2003, now Pat. No. 7,032,820.

(51) Int. Cl.
*G06F 19/00* (2006.01)
(52) U.S. Cl. .......................... 235/385; 235/375; 235/487
(58) Field of Classification Search .................. 235/375, 235/380, 382, 492, 487, 385
See application file for complete search history.

(56) References Cited

U.S. PATENT DOCUMENTS

| | | | |
|---|---|---|---|
| 5,726,884 A * | 3/1998 | Sturgeon et al. | 705/9 |
| 5,947,256 A | 9/1999 | Patterson | |
| 5,960,402 A | 9/1999 | Embutsu et al. | |
| 6,204,763 B1 | 3/2001 | Sone | |
| 6,265,977 B1 | 7/2001 | Vega et al. | |
| 6,304,855 B1 | 10/2001 | Burke | |
| 6,305,548 B1 | 10/2001 | Sato et al. | |
| 6,425,487 B1 | 7/2002 | Emmott et al. | |
| 6,759,959 B2 | 7/2004 | Wildman | |
| 6,761,318 B2 | 7/2004 | Dudek et al. | |
| 6,808,255 B1 | 10/2004 | Haines et al. | |
| 6,842,596 B2 | 1/2005 | Morii et al. | |
| 7,030,760 B1 * | 4/2006 | Brown | 340/568.1 |
| 7,032,820 B2 * | 4/2006 | Kreiner et al. | 235/385 |
| 2004/0133484 A1 | 7/2004 | Kreiner et al. | |
| 2009/0092028 A1 * | 4/2009 | Kondo | 369/100 |

FOREIGN PATENT DOCUMENTS

JP 2000-084532 3/2000

OTHER PUBLICATIONS

Website Printout: http://www.pnl.gov/nsd/commercial/rft-ags/market.html "RF Tags Market Information" Oct. 11, 2002.
Website Printout: http://www.pnl.gov/nsd/commercial/rft-ags/background.html "RF Tags Background" Oct. 11, 2002.

* cited by examiner

*Primary Examiner* — Karl D. Frech

(57) ABSTRACT

A post-consumption item that has a Radio Frequency (RF) tag associated therewith is disposed of by reading the RF tag to obtain information stored thereon and selecting a manner to dispose of the post-consumption item based on the obtained information. An inventory of post-consumption items that have RF tags associated therewith, respectively, is maintained by reading the RF tags to obtain categorization information stored thereon and maintaining the inventory of the post-consumption items based on the obtained categorization information.

24 Claims, 3 Drawing Sheets

METHODS FOR UTILIZING RF TAGS TO COLLECT DATA CONCERNING POST-CONSUMER RESOURCES

CROSS-REFERENCE TO RELATED APPLICATIONS

The present application is a continuation of application Ser. No. 11/409,829, filed Apr. 24, 2006 now U.S. Pat. No. 7,299,982, which itself is a continuation of application Ser. No. 10/338,422, filed Jan. 8, 2003, now U.S. Pat. No. 7,032,820, assigned to the assignee of the present application, the disclosures of which are hereby incorporated herein by reference.

FIELD OF THE INVENTION

This invention relates to the field of post-consumer resource management. More particularly, the invention relates to collecting data associated with tagged post-consumption items.

BACKGROUND

Nearly everything we do leaves behind some kind of waste. During the 1980's, waste management issues became a matter of heightened public concern because of increasing waste production, shrinking landfill capacity, rising disposal costs, public opposition to new landfills and public concern for the health of the planet. All of these factors have increased the importance of thoughtfully managing waste.

An article of waste can be considered to be unwanted matter, that which is left after useful substances or parts have been used, or alternatively, an article of waste can be considered to be a post-consumption item or material, a resource to be recycled or handled in a particular way to maximize usefulness or to minimize harmfulness. Almost all post-consumption items, (which include both the post-consumption items themselves and/or the containers that house the items) are either recyclable or should be managed in some particular way, (e.g., hazardous materials should be isolated from non-hazardous materials to avoid contaminating the non-hazardous materials; hazardous materials should be properly disposed of).

Households, for example, typically generate recyclable post-consumption items and materials such as cereal boxes and other paper products, steel and aluminum cans, plastic milk and juice cartons, glass jars and so on. Industries, manufacturers, commercial establishments, agricultural concerns and so on also typically generate recyclables.

Recycling is one method that maximizes the usefulness of post-consumption items. Recycling includes a series of activities associated with collecting and re-using materials that would otherwise fill landfills. Recycling includes sorting and processing recyclables into component materials and using these component materials to manufacture new products. Household and business-generated recyclables typically are collected at the curb, are taken to drop-off centers or buy-back centers, or are collected through deposit/refund programs. After collection, recyclables are typically sent to a materials recovery facility to be sorted and prepared into marketable commodities for input to further manufacturing processes. Recyclables generated by industries, manufacturers, agricultural concerns and the like are frequently sold to materials recovery facilities, brokers or manufacturers under private treaty.

Recycling typically depends largely on manual labor-intensive tracking and sorting operations. For example, consumers and businesses typically separate their post-consumption items into recyclables and non-recyclables, and separate recyclables into different categories (paper, plastic, aluminum and so on). As with all manual labor-intensive activities, these processes are error prone. For example, a consumer may not have time or the inclination to separate recyclables from non-recyclables, resulting in recyclables that needlessly end up in an incinerator or landfill. There are other problems with manual sorting as well. A consumer may not place a recyclable in the proper recycling container (i.e., may place a glass jar in the "plastic" recycling bin). Hence, even after recyclables are sorted into categories, typically recyclables are inspected and resorted before further processing, adding to the costs involved with recycling. Once separated and cleaned, these post-consumption items and materials may be ready to be recycled into new products.

More and more of today's products are being manufactured completely or partially from recycled materials. Consumers increasingly demand more environmentally-friendly products, thereby encouraging manufacturers to produce recycled products and to recycle items and materials used in the manufacturing process. It can only be expected that recycling will increase rather than decrease as the earth's resources are depleted and as people become increasingly concerned about the planet's health.

In addition to generating general recyclables, households may also produce post-consumption products containing hazardous materials that should receive special handling. For example, a diabetic in the household may generate, for instance, syringes, lancets and blood-contaminated alcohol pads. Empty (and not-so-empty) cans of paint and bug spray also constitute hazardous materials typically generated by households. This type of post-consumption product ideally should be separated from other products containing non-hazardous materials to prevent contamination of the non-hazardous materials, and typically should receive special treatment to reduce the volume or harmfulness of the hazardous material. Many household hazardous materials can also be recycled but may need special handling in the process.

Industries, manufacturers, commercial establishments and agricultural concerns also typically create hazardous byproducts that may or may not be recyclable but should be tracked and handled in a particular way. In industry, a manifest is typically used to track and manage hazardous materials. The United State Environmental Protection Agency (EPA) regulates some types of hazardous waste by requiring that it be tracked with a manifest and by requiring those who generate, recycle, treat, store and/or dispose of hazardous wastes to have permits for their operations. Treatment of hazardous waste, like manual sorting of recyclables, is also subject to human error. For example, workers may incorrectly identify or classify hazardous wastes, leading to inefficiencies in processing, or worse. Many hazardous post-consumption products generated by industry can also be recycled to save resources and frequently, reduce production costs.

Hence, a need exists for an automated, less labor-intensive, less error-prone way to identify, track, sort, distribute and broker post-consumption items and materials.

In the eighties, a new technology called Radio Frequency Identification (RFID) was developed for identification, tracking and data capture. In an RFID system, data is carried in a tag or smart label and is retrieved by machine-readable means. RFID systems offer an advantage over bar-coding because line-of-sight access to the tagged item is not necessary. RFID tags can be read through container walls, paint, dirt and in cluttered areas. In addition, RFID tags can be read and written to at a range of up to hundreds of meters. More than 500 tags per second can be read.

A basic RFID system consists of a reader and a tag that is electronically programmed with fixed (read only) or variable (read/write) data. Data stored in the tag is decoded by the reader and transmitted to a host computer to be processed. Communication between the tag and the reader typically is wireless.

An RF tag can be active, passive or semi-passive. An active tag is powered by a battery and can initiate communication with the reader. An active RF tag can be read and updated from distances of up to hundreds of kilometers. Passive and semi-passive tags are activated only when they are read or interrogated by another device first and typically have shorter read ranges. The information on an RF tag, whether active, passive or semi-passive can be changed or added to. RF tags come in a variety of shapes and sizes and can be housed in a protective covering, converted into paper labels, injected into plastic molds, inked onto surfaces and so on. The RF tag may emit a series of waveforms that can be interpreted by the reader as a binary number.

A reader is typically composed of an antenna and a coupler. An antenna emits radio signals to activate the tag and to read data from and write data to the tag. An antenna can produce an electromagnetic field ranging from one inch to 100 feet or more. The antenna transfers data from the tag to a coupler. The coupler controls data acquisition and communication.

RF tags can be inexpensive to produce and can be read through a variety of substances such as water, paint, and dirt. It would be helpful if there were a way to use RF tags to identify, manage, and manipulate post-consumption items and materials. It would also be helpful if information concerning post-consumption items were available. For example, entities such as manufacturers and retailers need information concerning consumer buying and consuming to determine re-stock patterns, time to use and product disposal in order to maximize efficiency and profitability. Information concerning buying may be available through automated inventory systems, for example, but capturing information at disposal time is frequently not possible or, alternatively, the information available may be very incomplete. Capturing information at disposal time would provide manufacturers and retailers with a complete life-cycle pattern. Hence a need exists to capture and provide post-consumption item information.

SUMMARY

According to some embodiments of the present invention, a post-consumption item that has a Radio Frequency (RF) tag associated therewith is disposed of by reading the RF tag to obtain information stored thereon and selecting a manner to dispose of the post-consumption item based on the obtained information.

In other embodiments, the post-consumption item is held in a container that has the RF tag associated therewith.

In still other embodiments, the post-consumption item is associated with a landmark that locates the post-consumption item, the landmark being associated with the RF tag.

In still other embodiments, the post-consumption item is commingled with a plurality of post-consumption items. Reading the RF tag may include reading a plurality of RF tags associated with the plurality of post-consumption items, respectively, to obtain information. Selecting the manner to dispose of the post consumption item may include selecting the manner to dispose of the post-consumption item based on the obtained information from the plurality of RF tags.

In still other embodiments, selecting the manner to dispose of the post-consumption item includes determining that the post-consumption item includes a hazardous material based on the obtained information, and sending the hazardous material to a hazardous material processing facility based on the determination that the post-consumption item is a hazardous material.

In still other embodiments, selecting the manner to dispose of the post-consumption item includes determining that the post-consumption item includes a recyclable material based on the obtained information, and sending the recyclable material to a recycling facility based on the determination that the post-consumption item is a recyclable material.

In still other embodiments, selecting the manner to dispose of the post-consumption item includes determining that the post-consumption item includes material that can be sold, and selling the material of the post-consumption item to a purchaser.

In still other embodiments, disposing of the post-consumption item includes quantifying an amount of the post-consumption item based on the obtained information, and selecting the manner to dispose of the post-consumption item based on the quantified amount.

In still other embodiments, the quantified amount is a count, a weight, and/or a volume.

In further embodiments of the present invention, an inventory of post-consumption items that have Radio Frequency (RF) tags associated therewith, respectively, is maintained by reading the RF tags to obtain categorization information stored thereon and maintaining the inventory of the post-consumption items based on the obtained categorization information.

In still further embodiments, at least a portion of the categorization information is stored on at least one of the RF tags.

In still further embodiments, the categorization information includes recyclability information, hazard information, biodegradability information, recall information, serial number information, production lot information, location information, date information, weight information, volume information, composition information, subcomponent information, RF reader information, RF reader owner information, disposal company information, shelf life information, and/or product group information.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. As should be understood, however, the invention is not limited to the precise arrangements and instrumentalities shown. In the drawings.

DETAILED DESCRIPTION OF EMBODIMENTS

Life Cycle of an Article

Figure 1:
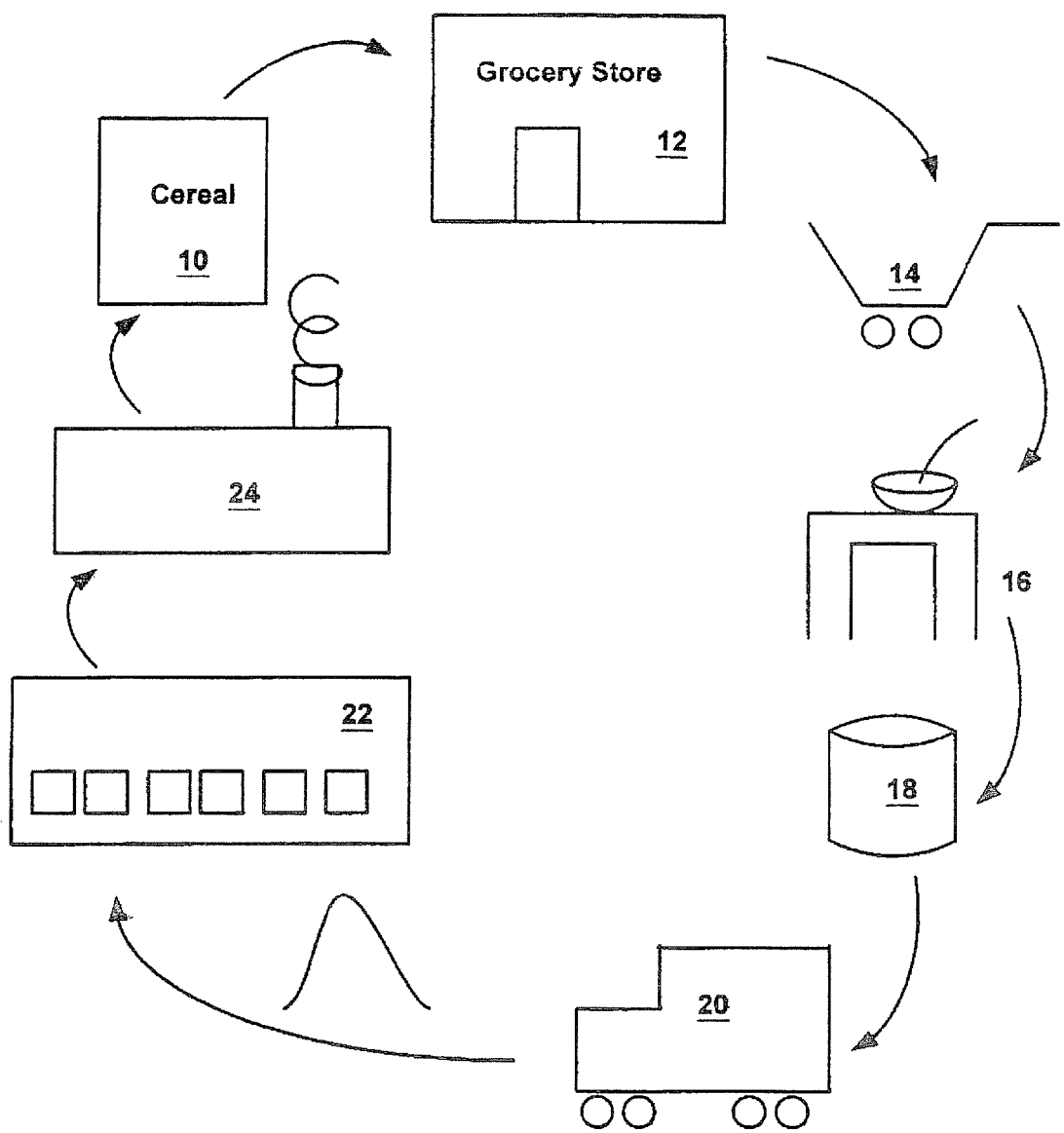
FIG. 1 illustrates a post-consumption item life cycle as is known in the art.

FIG. 1 illustrates an exemplary life cycle of an article that is recycled or processed. An item (e.g., a box to be filled with cereal) 10 is produced by a manufacturer 24, filled with cereal by the same or another manufacturer and is transported to a retail establishment such as a grocery store 12 for sale. A consumer may purchase the item 14, consume or use it 16, throw the item or the empty container in the garbage, trash or recycling 18. A waste management or recycling service may collect the item 20 and transport the item to a recycling, processing or disposal facility or the like 22. The facility 22 may process the item so that the useful components of the item 10 (e.g., paper) can be re-used at a manufacturer 24 to produce a new item (e.g., a cereal box to be filled with cereal) or may otherwise dispose of the item.

RF Tag Post-Consumption Data Acquisition System and Method According to the Present Invention After consumption or use, or upon designation of an item as "waste" or "to be recycled", an RF tag-based post consumption data collection system and method retrieves data from an RF tag associated with the item.

The RF tag may be attached to, embedded within or otherwise associated with an item that has been used, consumed or designated to be disposed of, recycled or the like. Alternatively, the RF tag may be attached to, embedded within or otherwise associated with a container for such an item. (For example, an RF tag may be incorporated into a cereal box. In this case, the post-consumption item may be the cereal box, not the cereal originally contained within the cereal box. On the other hand, an RF tag may be attached to a bottle containing mercury. In this case the post-consumption item associated with the RF tag may be the mercury.)

The data retrieved from the RF tag is collected by an RF reader and stored in one or more datastores of information concerning the post-consumption item. The data retrieved from the RF tag may be matched, combined with, added to or incorporated within one or more additional pre-existing datastore(s). The data may be stored and processed on a computing device associated with the reader and/or transmitted to a host computer for storage and processing. Characteristics such as, but not limited to, the composition and nature of the post-consumption item are determined. The data may be combined with other pre- or post-consumption item data, further processed, and provided for sale.

The data on the RF tag may be updated. For example, the RF tag of the item may be updated with information such as the present location of the item, an identification number of the device updating the tag, the time at which the tag was read by the reader or any other suitable information.

The information from the RF tag may be collected when the item is placed in a waste or recycling receptacle or the like, or when the item is retrieved by a waste management or other type of retrieval agent, when the item arrives at a recycling, waste or other facility or at any other suitable time or combination thereof.

Actions to be taken concerning the item may be determined based on information retrieved from the RF tag. The item may be collected, sorted, processed, recycled, brokered and/or disposed of in accordance to the determined characteristics of the item, based on the RF tag information, alone or in combination with other information from other sources.

System for Acquiring Data about Post-Consumption Items

Figure 2:
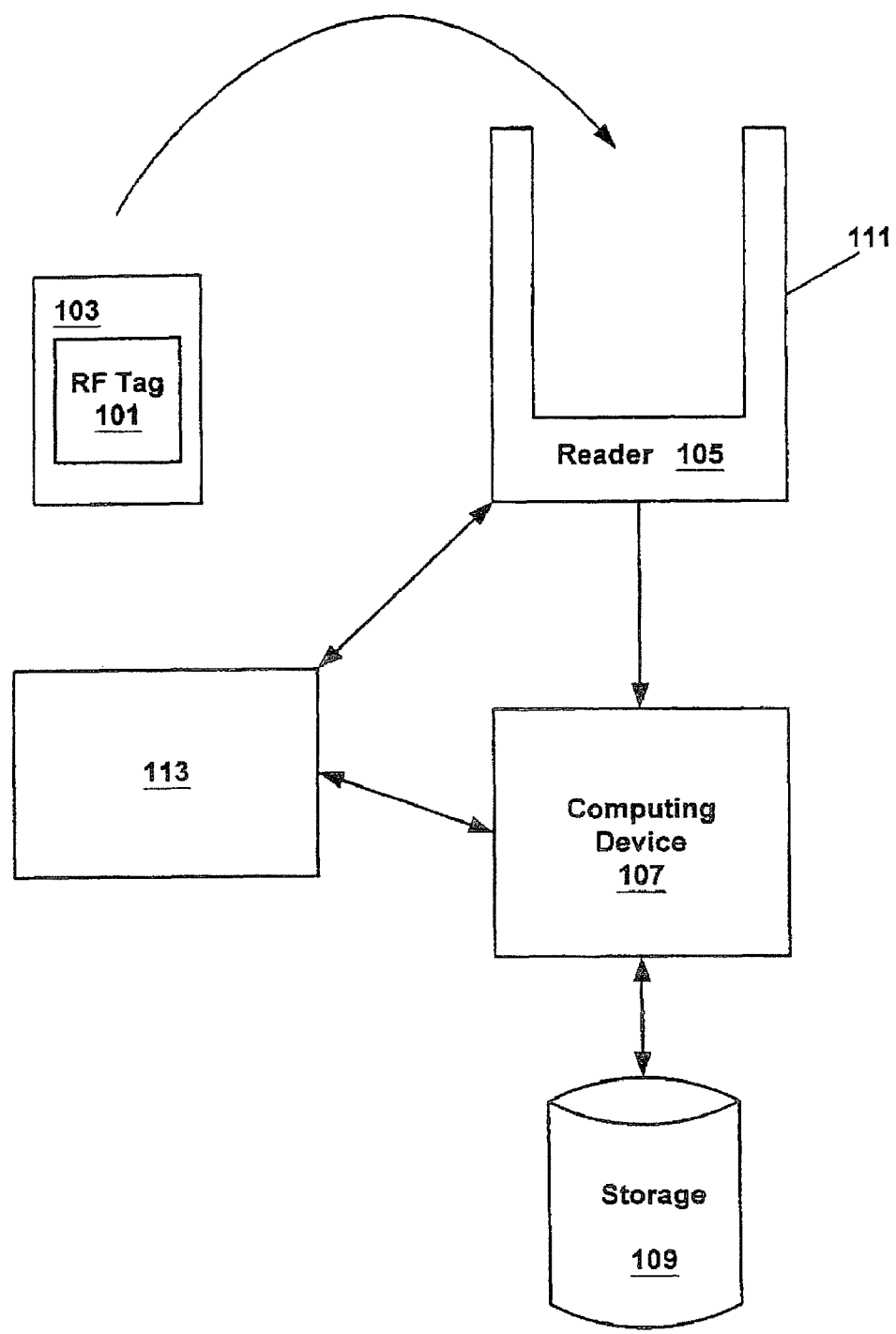
FIG. 2 illustrates, in a general block diagram form, a post-consumption data acquisition system in accordance with one embodiment of the present invention.

Referring to FIG. 2, a system for identifying and collecting data concerning post-consumption items via RF tags includes a reader 105 for receiving, controlling and transferring information ascertained from an RF tagged item 103 or material or RF-tagged container for such an item or material, and a computing device 107 for processing and storing the collected information. Computing device 107 may be associated with internal or external storage media 109 for storing the RF tag data. Software resident at the computing device 107 or a device 113 in communication with the computing device 107 or reader 105 may process and incorporate the collected information with information collected from other readers and optionally other computing devices. The system may include means for sorting, storing, processing, transmitting and brokering the information.

The RF tag 101 may be embedded within the item 103 or within an object attached to the item, (such as, but not limited to, a label), applied to the surface of the item either directly or indirectly, attached to the item permanently or non-permanently, or otherwise suitably affixed to or associated with the item. Alternatively, the RF tag may be embedded within or applied upon a container that holds the item or embedded within or applied upon an object attached to the container, (such as but not limited to a label), applied to the surface of the container either directly or indirectly, attached to the container permanently or non-permanently, or otherwise suitably affixed to the container. For example, an RF tag may be inked onto a can by applying a non-conductive material to the can and then applying a circuit upon the non-conductive material by using a liquid metal ink.

The RF tag may be an active, passive or semi-passive RF tag. The RF tag may be a read only or a read/write tag. In one embodiment the RF tag is a read/write passive tag.

After the RF-tagged item 103 or the material contained within the RF-tagged item has been used or when the RF-tagged item or material contained within the RF-tagged item is available for disposal, treatment or recycling, the item 103 may be placed within a receptacle 111 to which a reader 105 is attached or alternatively, may be placed in proximity to (within read range of) a reader. The reader 105 may emit a radio frequency of a specified frequency or frequency range. If the RF tag 101 is a passive tag, the emission of the radio frequency energy by the reader may cause the passive RF tag 101 to emit a series of waveforms. Alternatively, if an active RF tag or semi-passive RF tag (not shown) is applied to or embedded within the item or item container, the tag may emit the waveforms even if the reader does not generate the RF energy.

The waveforms emitted by the RF tag may be interpreted by the reader 105 as data. The data may be in the form of a binary number or may be in some other form. In one embodiment, the data received by the reader is a relatively large binary number, on the order of 96 bits or more. The data may include any or all of the following data elements:

a recyclable indicator to indicate whether the item (i.e., the container) can be recycled or whether the contents of the container can be recycled;

a hazardous material indicator to indicate whether the item or its contents is or comprises a hazardous material;

a biodegradable indicator to indicate whether the item or its contents is or comprises a biodegradable material;

a recall indicator to indicate whether the item or its contents is or contains the subject of a recall;

a serial number for the item or its contents;

a production lot number for the item or its contents;

one or more location fields for tracking current and previous locations of the post-consumption item or it contents;

dates, such as but not limited to dates of changes of location or read dates;

weight of the item or its contents (for example, if the item is a can of dog food, the weight indicated here may be the weight of the empty can);

volume, (for example, if the item is a can of dog food, the volume may be the space the compacted or uncompacted can may occupy in a receptacle);

one or more composition fields, (for example, if the item is a computer, valuable recyclables may include the gold used in circuit boards, if the item contains a hazardous material, the amount of the hazardous material contained in the item, as manufactured, for instance);

one or more subcomponent fields, (for example, if the item is a computer, subcomponents may be circuit boards, memory and batteries);

reader identification number, (identifying the particular reader that last updated the RF data, for example)

identification of reader owner (name, address, location, etc.)

one or more fields for retrieval company (for example, the name of the waste management company and the name of the recycling service that the owner has contracted with for retrieval of post consumption items and material);

shelf life of the item or contents of the item; and other suitable information.

The data or a data element of the data may identify an item uniquely, (e.g., a particular CD player) or may identify an item as belonging to a particular group of items, (e.g., the RF tag may identify that a particular can of dog food was one of a group of cans of a particular brand of dog food produced by a particular manufacturing plant on a certain day or range of days).

Information concerning the above listed and other attributes may be updated on the RF tag.

Information retrieved from the RF tag may be collected and stored within a datastore. A typical datastore may include the information retrieved from the RF tag and other data elements.

The reader 105 preferably includes an antenna (not shown) for sending and receiving RF energy and for transferring the data received from the RF tag 101 to a coupler (not shown). The reader may include or be associated with a coupler for receiving the data sent from the antenna. The coupler may be associated with, attached to or integrated with a computing device. The coupler may be in communication with one or more computing devices 107, associated with internally or externally stored datastores. The coupler may also be in communication with one or more additional computing devices 113. Computing devices 107, 113 may be connected to a network.

The coupler or the computing device 107 may include software that processes the data received from the RF tag 101. Alternatively, or additionally, the coupler or the computing device 107 may transmit the RF tag data to other computing devices 113 within a network of computing devices for processing and data storage. The computing device 107 may itself comprise a wired or wireless internal or external network of computing devices, such as but not limited to a LAN, WAN, intranet, the internet or any suitable network. The network to which computing device 113 is connected may comprise a wired or wireless network of connected computing devices. For example, the computing device 107 may comprise a building management system connected to an external network of computers 113. Hence, the coupler may transmit the data received from the antenna of reader 105 directly or indirectly to an external network for processing on a computing device within the external network. The information collected from the RF tag reader 105 may be incorporated within a datastore of information including information collected by a plurality of readers at the same or different locations.

The data collected and compiled within one or more datastores within the network may be further processed, combined with other information, offered for sale and sold. For example, the information retrieved from and written to RF tags may be used to show how items are being consumed or used. For example, marketers and retailers may use the data collected by RF tag readers to see how items are being used, as opposed to how items are being sold. As a specific example, an inventory system of a grocery store may show that a large quantity of an item has been sold during a particular time period. The grocery store management may find it helpful to know the consumption patterns of the item as well in order to predict future demand for the item. If most of the items are consumed or used quickly, it may be more likely that demand will increase, giving the grocery store notice that it should restock the item. On the other hand, if the item is not being consumed or used, perhaps the demand will not be as great because purchasers still have the item and so have no need to purchase more. Information collected from a number of RF tags may be collected, processed, combined with information from other sources, sorted, merged, filtered and sold to interested parties or otherwise used.

Information concerning a post-consumption item may be linked (by serial number, for example) with information concerning the pre-consumed item collected by other data collection systems. Inventory systems keyed on data elements such as serial number, for example, are known. By combining captured pre-consumer information with post-consumption information, the entire life cycle of an item may be tracked. This information may be useful to any number of entities, including retailers, manufacturers, distributors and the like.

For example, the collected and processed data may be helpful to track consumer purchase versus use patterns. A pet owner who lives in Atlanta but has a cabin in the mountains may choose to purchase pet food in the mountains because pet food is less expensive there. A grocery store in Atlanta may find this information useful in decisions concerning pricing of pet food. A recycling facility may find it useful to know where items dropped off at the recycling center were originally purchased. Grocery stores, pharmacies and retailers may find it useful to know how long it takes a particular item to go from being stocked on the shelf to being placed in a waste or recycling receptacle. This information may be correlated with shelf life of the item to determine how prevalent storage of an item past its allowable shelf life is. The information collected may be processed to provide information that is valuable to particular industries.

Method for Acquiring Data Concerning Post-Consumption Items

Figure 3:
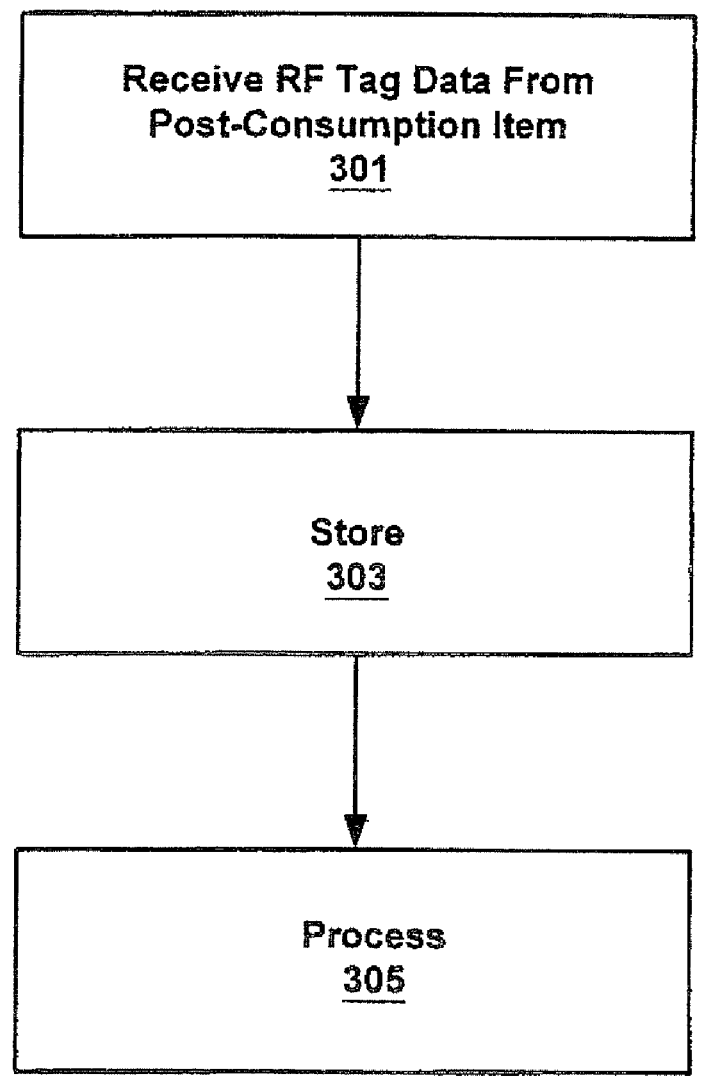
FIG. 3 is a flowchart of an exemplary process for collecting information associated with post-consumption items in accordance with one embodiment of the present invention.

FIG. 3 is a flow diagram illustrating a method of collecting information concerning post-consumption items in accordance with one embodiment of the invention. At step 301 RF tag data is received. In one embodiment of the invention, the RF tag data is received when an RF-tagged item comes within reading proximity of a reader. The reader may be associated with a receptacle for the post-consumption item. The data on the RF tag may be updated with new or changed information as described above. At step 303 the data retrieved from the tagged item or contents is stored. The data may be stored in an internal or external datastore. At step 305 the data is processed. The processing step may include retrieving additional information concerning the post-consumption item from an external or internal datastore of information and/or storing some combination of the data to an external or internal datastore of information. The data may be combined, sorted, and transmitted to other network elements as described above.

In response to the collected information, a number of actions can be initiated. For example, in response to determining that a particular reader associated with a recycling receptacle has read RF tags associated with items containing a pre-determined weight or volume of a particular material such as steel, aluminum, etc., a retrieval request may be initiated. In response to determining that a recycling receptacle contains a biohazard or particular (perhaps dangerous) item, a biohazard retrieval request may be initiated, and so on.

The data collected from RF-tagged post consumption items can be processed so that, for example, when a retrieval vehicle arrives at a processing center, the amount of post-consumption steel (or aluminum or paper, etc.) available within a quantity of sorted or unsorted material is determinable. Based on the information received from the RF tag and (optionally) associated datastores, a materials broker can determine what and how much material is available where. This data can be leveraged to determine an advantageous time to sell recyclables and to determine to whom to sell the recyclables or other tagged items. For example, if a waste management service knows that it has a certain amount of post consumption steel available and knows that there are three manufacturers that use post-consumption steel, the waste management service could determine which of the three would provide the best profit, taking into account the price offered, the location of the manufacturer and the location(s) of the post-consumption steel.

Based on the information collected from one or more readers, a further action or actions to be taken with the item may be ascertained. Based on information concerning the current contents of the receptacle, any number of events may be triggered. For example, a building management system may receive information concerning the imminent arrival of a vehicle for retrieving the items or materials. The notice of arrival of the vehicle may result in the building management system positioning the container so as to facilitate retrieval of the items or materials. Retrieval of the RF-tagged items may be scheduled based on the known content of the receptacle(s). For example, instead of scheduling a retrieval at regular intervals (every Thursday, for example), a retrieval may be scheduled based on when the receptacle(s) are filled, determined based on weight or volume information gathered by the reader. Alternatively, a retrieval may be scheduled based on the need for a particular post-consumption item or composition of item. (A retrieval of aluminum recyclables may be scheduled because one of the manufacturers supplied by the retrieval company needs aluminum, for instance.) Alternatively, retrievals may be scheduled when the market price for the item or composition of the item is high. (A retrieval of aluminum recyclables may be scheduled because aluminum recyclables are receiving a favorable price.) Based on information acquired from RF tagged items concerning the current contents of the receptacles of a number of businesses, industries or households, retrievals may be scheduled and routed.

As discussed above, the data collected by one or more readers can be stored on a computing device or sent to a collective datastore resident on or coupled to a host computer of a wired or wireless network. The host computer may store data received from a plurality of households or locations in the datastore. The datastore may comprise one or more datastore(s) or file(s). The data collected may be used to generate a graphical display of where post-consumption items are located. Similarly the datastore may be utilized to generate electronic or traditional paper notifications to waste management services or recycling services that a collection should be scheduled. Similarly the datastore may be used to notify collectors of unusual pickup circumstances. For example, perhaps a general waste or recycling retrieval is scheduled for a particular day or time at a particular location, (e.g., a household or business), but at the particular time there is little or nothing to retrieve. In this case a notification may be sent to the retrieval service not to stop at that location. Alternatively, an additional retrieval may be scheduled for any reason including a need for raw materials, optimization of routing, amount of waste or recycling generated, or the like.

It is noted that the foregoing examples have been provided merely for the purpose of explanation and are in no way to be construed as limiting of the present invention. As an example, if a function such as maintenance and/or querying of a datastore query is attributed to a particular element such as a reader, it will be understood that the function may be performed alternatively or additionally by a building management component or by any suitable network element without departing from the spirit and scope of the invention.

That which is claimed:

1. A method of disposing of a plurality of different types of post-consumption items, wherein each of the plurality of different types of post-consumption items has a radio frequency tag associated therewith, comprising:
    reading each radio frequency tag of the plurality of different types of post-consumption items to obtain information stored thereon; and
    selecting a manner to dispose of a particular type of post-consumption item of the plurality of different types post-consumption items based on the information when an amount of the particular type of post-consumption item reaches a predetermined level;
    wherein the manner specifies a way that the particular type of post-consumption item is treated during disposal.

2. The method of claim 1, wherein the particular type of post-consumption item is held in a container that has the radio frequency tag associated therewith.

3. The method of claim 1, wherein the particular type of post-consumption item is associated with a landmark that locates the post-consumption item, the landmark being associated with the radio frequency tag.

4. The method of claim 1, wherein the selecting the manner to dispose of the particular type of post-consumption item comprises:
    determining that the particular type of post-consumption item comprises a hazardous material based on the information; and
    sending the hazardous material to a hazardous material processing facility based on the determining that the particular type of post-consumption item comprises the hazardous material.

5. The method of claim 1, wherein the selecting the manner to dispose of the particular type of post-consumption item comprises:
    determining that the particular type of post-consumption item comprises a recyclable material based on the information; and
    sending the recyclable material to a recycling facility based on the determining that the particular type of post-consumption item comprises the recyclable material.

6. The method of claim 1, wherein the selecting the manner to dispose of the particular type of post-consumption item comprises:
    determining that the particular type of post-consumption item comprises a material that can be sold; and
    selling the material of the particular type of post-consumption item to a purchaser.

7. The method of claim 1, wherein the disposal of the particular type of post-consumption item comprises:
    quantifying an amount of the particular type of post-consumption item based on the information; and
    selecting the manner to dispose of the particular type of post-consumption item based on the amount.

8. The method of claim 7, wherein the amount is a count, a weight, or a volume.

9. A method of maintaining an inventory of different types of post-consumption items, the different types of post-consumption items having radio frequency tags associated therewith, respectively, the method comprising:

reading the radio frequency tags respectively associated with the different types of post-consumption items to obtain categorization information stored thereon, the categorization information being related to manners in which the different types of post-consumption items are to be disposed of;

maintaining the inventory of the different types of post-consumption items based on the categorization information; and disposing of a particular type of post-consumption item via a respective manner when an amount of the particular type of post-consumption item reaches a pre-determined level in the inventory, wherein the manners specify ways in which the different types of post-consumption items are treated during disposal.

10. The method of claim 9, further comprising:
storing at least a portion of the categorization information on at least one of the radio frequency tags.

11. The method of claim 9, wherein the categorization information comprises recyclability information.

12. The method of claim 9, wherein the categorization information comprises hazard information.

13. The method of claim 9, wherein the categorization information comprises biodegradability information.

14. The method of claim 9, wherein the categorization information comprises recall information.

15. The method of claim 9, wherein the categorization information comprises serial number information.

16. The method of claim 9, wherein the categorization information comprises production lot information.

17. The method of claim 9, wherein the categorization information comprises location information.

18. The method of claim 9, wherein the categorization information comprises date information.

19. The method of claim 9, wherein the categorization information comprises weight information or volume information.

20. The method of claim 9, wherein the categorization information comprises composition information or subcomponent information.

21. The method of claim 9, wherein the categorization information comprises radio frequency reader information or radio frequency reader owner information.

22. The method of claim 9, wherein the categorization information comprises disposal company information.

23. The method of claim 9, wherein the categorization information comprises shelf life information.

24. The method of claim 9, wherein the categorization information comprises product group information.

* * * * *